(12) United States Patent
Levy et al.

(10) Patent No.: US 10,476,794 B2
(45) Date of Patent: Nov. 12, 2019

(54) EFFICIENT CACHING OF TCAM RULES IN RAM

(71) Applicant: Mellanox Technologies TLV Ltd., Raanana (IL)

(72) Inventors: Gil Levy, Hod Hasharon (IL); Pedro Reviriego, Madrid (ES); Aviv Kfir, Nili (IL); Salvatore Pontarelli, Rome (IT)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 168 days.

(21) Appl. No.: 15/663,758

(22) Filed: Jul. 30, 2017

(65) Prior Publication Data

US 2019/0036821 A1     Jan. 31, 2019

(51) Int. Cl.
| | |
|---|---|
| H04L 12/747 | (2013.01) |
| G06F 12/0868 | (2016.01) |
| H04L 12/743 | (2013.01) |
| H04L 29/06 | (2006.01) |
| H04L 29/08 | (2006.01) |

(52) U.S. Cl.
CPC ........ H04L 45/742 (2013.01); G06F 12/0868 (2013.01); H04L 45/7453 (2013.01); H04L 67/2842 (2013.01); H04L 69/22 (2013.01); G06F 2212/1024 (2013.01); G06F 2212/608 (2013.01)

(58) Field of Classification Search
None
See application file for complete search history.

(56) References Cited

U.S. PATENT DOCUMENTS

| | | |
|---|---|---|
| 6,611,875 B1 | 8/2003 | Chopra et al. |
| 6,957,215 B2 | 10/2005 | Stark |
| 7,051,078 B1 | 5/2006 | Cheriton |
| 7,054,315 B2 | 5/2006 | Liao |
| 7,061,874 B2 | 6/2006 | Merugu et al. |
| 7,116,663 B2 | 10/2006 | Liao |
| 7,234,019 B1 | 6/2007 | Kao et al. |

(Continued)

OTHER PUBLICATIONS

Kasnavi et al., "A cache-based Internet protocol address lookup architecture", Computer Networks, vol. 52, pp. 303-326, year 2008.

(Continued)

Primary Examiner — George C Atkins
(74) Attorney, Agent, or Firm — Kligler & Associates

(57) ABSTRACT

Communication apparatus includes a TCAM, which stores a corpus of rules, including respective sets of unmasked and masked bits. The rules conform to respective rule patterns, each defining a different, respective sequence of masked and unmasked bits to which one or more of the rules conform. A RAM caches rule entries corresponding to rules belonging to one or more of the rule patterns that have been selected for caching. Decision logic extracts respective classification keys from data packets, each key including a string of bits extracted from selected fields in a given data packet, and classifies the data packets by first matching the respective classification keys to the cached rule entries in the RAM and, when no match is found in the RAM, by matching the respective classification keys to the rules in the TCAM.

22 Claims, 4 Drawing Sheets

(56) References Cited

U.S. PATENT DOCUMENTS

| | | | |
|---|---|---|---|
| 7,394,809 | B2 | 7/2008 | Kumar et al. |
| 7,804,699 | B2 | 9/2010 | Gupta et al. |
| 7,933,282 | B1* | 4/2011 | Gupta .............. G06F 16/90339 370/412 |
| 8,271,564 | B2 | 9/2012 | Dade et al. |
| 8,290,934 | B2 | 10/2012 | Stergiou et al. |
| 8,305,271 | B2 | 11/2012 | Li et al. |
| 8,462,786 | B2 | 6/2013 | Liu et al. |
| 8,619,766 | B2 | 12/2013 | Wang et al. |
| 8,856,203 | B1 | 10/2014 | Schelp et al. |
| 9,098,601 | B2 | 8/2015 | Wang |
| 9,111,615 | B1 | 8/2015 | Jiang |
| 9,171,030 | B1 | 10/2015 | Arad et al. |
| 9,223,711 | B2 | 12/2015 | Philip et al. |
| 9,262,312 | B1 | 2/2016 | Gazit et al. |
| 9,317,517 | B2 | 4/2016 | Attaluri et al. |
| 9,344,366 | B2 | 5/2016 | Bouchard et al. |
| 9,424,366 | B1 | 8/2016 | Gazit et al. |
| 9,438,505 | B1 | 9/2016 | Zhou et al. |
| 9,569,561 | B2 | 2/2017 | Wildman et al. |
| 9,627,063 | B2 | 4/2017 | Dharmapurikar |
| 9,659,046 | B2 | 5/2017 | Sen et al. |
| 9,704,574 | B1 | 7/2017 | Shamis |
| 9,779,123 | B2 | 10/2017 | Sen et al. |
| 9,785,666 | B2 | 10/2017 | Li et al. |
| 9,892,057 | B2 | 2/2018 | Levy et al. |
| 9,984,144 | B2 | 5/2018 | Levy et al. |
| 10,049,126 | B2 | 8/2018 | Levy et al. |
| 10,068,034 | B2 | 9/2018 | Levy et al. |
| 2002/0089937 | A1 | 7/2002 | Venkatachary et al. |
| 2003/0123459 | A1 | 7/2003 | Liao |
| 2006/0209725 | A1 | 9/2006 | Cadambi et al. |
| 2008/0192754 | A1 | 8/2008 | Ku et al. |
| 2008/0228691 | A1 | 9/2008 | Shavit et al. |
| 2010/0080223 | A1 | 4/2010 | Wong et al. |
| 2010/0269024 | A1 | 10/2010 | Hao et al. |
| 2012/0275466 | A1 | 11/2012 | Bhadra et al. |
| 2013/0311492 | A1 | 11/2013 | Calvignac et al. |
| 2014/0006706 | A1* | 1/2014 | Wang .............. G06F 16/90339 711/108 |
| 2014/0089498 | A1 | 3/2014 | Goldfarb et al. |
| 2014/0201307 | A1* | 7/2014 | Banavalikar .......... H04L 45/742 709/213 |
| 2014/0215144 | A1 | 7/2014 | Valency et al. |
| 2014/0310307 | A1 | 10/2014 | Levy et al. |
| 2015/0052309 | A1 | 2/2015 | Philip et al. |
| 2015/0058595 | A1 | 2/2015 | Gura et al. |
| 2015/0127900 | A1* | 5/2015 | Dharmapurikar ...... G11C 15/04 711/108 |
| 2015/0207735 | A1* | 7/2015 | Kuramoto .............. H04L 45/742 370/392 |
| 2015/0242429 | A1 | 8/2015 | Varvello et al. |
| 2015/0244842 | A1 | 8/2015 | Laufer et al. |
| 2016/0294625 | A1 | 10/2016 | Mahkonen et al. |
| 2017/0046395 | A1 | 2/2017 | Li et al. |
| 2017/0052731 | A1 | 2/2017 | Levy et al. |
| 2017/0053012 | A1 | 2/2017 | Levy et al. |
| 2017/0068669 | A1 | 3/2017 | Levy et al. |
| 2017/0147254 | A1* | 5/2017 | Adams ................ G06F 12/0638 |
| 2017/0195253 | A1* | 7/2017 | Annaluru ............ H04L 41/0816 |
| 2017/0286292 | A1 | 10/2017 | Levy et al. |
| 2017/0346765 | A1 | 11/2017 | Immidi |
| 2018/0278525 | A1 | 9/2018 | Levy et al. |

OTHER PUBLICATIONS

Pagh, R., "Cuckoo Hashing for Undergraduates", IT University of Copenhagen, 6 pages, Mar. 27, 2006.

Pagh et al., "Cuckoo Hashing", Journal of Algorithms, vol. 51, pp. 122-144, May 2004.

Kirsch et al., "Less Hashing, Same Performance: Building a Better Bloom Filter", Random Structures and Algorithms, vol. 33, issue 2, pp. 187-218, Sep. 2008.

Kirsch et al., "More Robust Hashing: Cuckoo Hashing with a Stash", SIAM Journal on Computing, vol. 39, Issue 4, pp. 1543-1561, Sep. 2009.

Patrow, A., "General Purpose Hash Function Algorithms", 6 pages, year 2000 http://www.partow.net/programming/hashfunctions/.

Lakshminarayanan et al., "Algorithms for advanced packet classification with ternary CAMs", Proceedings of the 2005 conference on Applications, technologies, architectures, and protocols for computer communications (SIGCOMM 05), pp. 193-204, Aug. 21-26, 2005.

Song et al., "Fast Hash Table Lookup Using Extended Bloom Filter: An Aid to Network Processing", Proceedings of SIGCOMM Conference, Philadelphia, USA, pp. 181-192, Aug. 21-26, 2005.

Waldvogel et al., "Scalable High-Speed Prefix Matching", ACM Transactions on Computer Systems (TOCS), vol. 19, Issue 4, pp. 440-482, Nov. 2001.

Vamanan et al., "EffiCuts: optimizing packet classification for memory and throughput", Proceedings of the SIGCOMM conference, New Delhi, India, pp. 207-218, Aug. 30-Sep. 3, 2010.

Singh et al., "Packet classification using multidimensional cutting", Proceedings of SIGCOMM Conference, Karlsrube, German, pp. 213-224, Aug. 25-29, 2003.

Taylor et al., "ClassBench: a packet classification benchmark", WUCSE-2004-28, Applied Research Laboratory Department of Computer Science and Engineering, Washington University, Saint Louis, USA, 37 pages, May 21, 2004.

Demetriades et al., "An Efficient Hardware-basedMulti-hash Scheme for High Speed IP Lookup", 16th IEEE Symposium on High Performance Interconnects, pp. 103-110, Aug. 26-28, 2008.

Meiners et al., "Algorithmic Approaches to Redesigning TCAM-Based Systems", Proceedings of the 2008 ACM SIGMETRICS international conference on Measurement and modeling of computer systems (SIGMETRICS '08), pp. 467-468, Jun. 2-6, 2008.

Laurence et al., "Spam Based Architecture for tcam for Low Area and Less Power Consumption", ARPN Journal of Engineering and Applied Sciences, vol. 10, No. 17, pp. 7607-7612, Sep. 2015.

Levy et al., U.S. Appl. No. 15/257,957, filed Sep. 7, 2016.

U.S. Appl. No. 14/827,373 Office Action dated Oct. 6, 2017.

Levy et al., U.S. Appl. No. 15/469,530, filed Mar. 26, 2017.

Matousek, et al., "ClassBench-ng: Recasting ClassBench After a Decade of Network Evolution", Proceedings of the Symposium on Architectures for Networking and Communications Systems (ANCS '17) ,13 pages, May 2017.

Hua et al., "Variable-Stride Multi-Pattern Matching for Scalable Deep Packet Inspection", IEEE INFOCOM , pp. 415-423, Rio de Janeiro, Brazil, Apr. 19-25, 2009.

Che et al., "DRES: Dynamic Range Encoding Scheme for TCAM Coprocessors", IEEE Transactions on Computers, vol. 57, No. 7, pp. 902-915, Jul. 2008.

Liu et al., "TCAM Razor: A Systematic Approach Towards Minimizing Packet Classifiers in TCAMs", IEEE/ACM Transactions on Networking, vol. 18, No. 2, pp. 490-500, Apr. 2010.

Liu et al., "All-Match Based Complete Redundancy Removal for Packet Classifiers in TCAMs", Proceedings of IEEE 27th Conference on Computer Communications (INFOCOM 2008), pp. 574-582, Apr. 13-18, 2008.

Liu et al., "Complete Redundancy Removal for Packet Classifiers in TCAMs", IEEE Transactions on Parallel and Distributed Systems, vol. 21, No. 4, pp. 424-437, Apr. 2010.

Taylor et al., "Scalable Packet Classification using Distributed Crossproducting of Field Labels", IEEE INFOCOM, pp. 1-12, 2005.

U.S. Appl. No. 14/827,402 office action dated Apr. 16, 2019.

* cited by examiner

EFFICIENT CACHING OF TCAM RULES IN RAM

FIELD OF THE INVENTION

The present invention relates generally to network communication, and particularly to methods and systems for efficient storage and lookup of classification rules in network elements.

BACKGROUND

Packet-transfer devices in high-speed data networks, such as switches and routers, are required to perform flexible and sophisticated packet classification at high speed. For this purpose, many network devices use ternary content-addressable memory (TCAM) components to store rules that are to be applied in processing packets. To search the TCAM, several fields of the packet (typically header fields) are concatenated to form a key. A match between the key and a given TCAM entry can be used to trigger various actions in the network device, such as forwarding decisions, packet encapsulation and de-capsulation, security filtering, and quality of service classification.

TCAM is advantageous in that it is able to hold rule entries that contain not only ones and zeroes, to be matched against the key, but also "don't care" bits, which will match either a zero or a one in the key. These "don't care" bits in the TCAM entries are commonly referred to as "masked" bits, while bits having a defined value (1 or 0) are referred to as "unmasked." TCAM thus affords a high degree of flexibility in rule definition.

U.S. Patent Application Publication 2017/0052731, whose disclosure is incorporated herein by reference, describes a method for classification that includes extracting respective classification keys from a collection of data items and receiving a corpus of rules for matching to the classification keys. At least some of the rules include masked bits in addition to the unmasked bits. Rule patterns are extracted from the corpus, defining different, respective sequences of masked and unmasked bits to which one or more of the rules conform. The rule patterns are grouped into extended rule patterns, such that the respective set of unmasked bits in any rule pattern is a superset of the unmasked bits in the extended rule pattern into which it is grouped. Rule entries corresponding to the rules are computed using the extended rule patterns and are stored in a random access memory (RAM). The data items are classified by matching the respective classification keys to the rule entries in the RAM.

SUMMARY

Embodiments of the present invention that are described herein provide methods and apparatus for efficient storage and lookup of classification rules in random-access memory (RAM).

There is therefore provided, in accordance with an embodiment of the invention, communication apparatus, including one or more ports, configured to receive data packets from a network. A TCAM interface is configured for connection to a ternary content-addressable memory (TCAM), which stores a corpus of rules, each rule including a respective set of unmasked bits having corresponding bit values, and at least some of the rules including masked bits in addition to the unmasked bits. The rules conform to respective rule patterns, each rule pattern defining a different, respective sequence of masked and unmasked bits to which one or more of the rules conform. A random access memory (RAM) is configured to cache rule entries corresponding to rule belonging to one or more of the rule patterns that have been selected for caching. Decision logic is configured to extract respective classification keys from the data packets, each classification key including a string of bits extracted from selected fields in a given data packet, and to classify the data packets by first matching the respective classification keys to the cached rule entries in the RAM and, when no match is found in the RAM, by matching the respective classification keys to the rules in the TCAM.

In some embodiments, the decision logic is configured to match the respective classification keys to the cached rule entries by applying to the classification keys, for each rule pattern among the selected rule patterns, a respective mask corresponding to the masked bits in the rule pattern, and to compare only the bits of the classification keys that are unmasked by the respective mask to the cached rule entries belonging to the rule pattern. In a disclosed embodiment, the decision logic is configured to compute a hash over the bits of the classification key that are unmasked by the respective mask for each rule pattern among the selected rule patterns, and to access the cached rule entries belonging to the rule pattern in the RAM using the hash.

Additionally or alternatively, when a plurality of the rule patterns, having different, respective masks, are selected for caching, the rule entries belonging to the selected rule patterns are stored in a plurality of respective tables in the RAM, and the decision logic is configured to search each of the tables using the respective mask of the rule pattern.

In one embodiment, the selected rule patterns include an extended rule pattern, wherein the rule patterns are grouped into extended rule patterns such that the respective set of unmasked bits in any rule pattern that is grouped into the extended rule pattern is a superset of the unmasked bits in the extended rule pattern. The decision logic is configured to apply the respective mask corresponding to the masked bits in the extended rule pattern in order to search the cached rule entries belonging to the extended rule pattern in the RAM.

In a disclosed embodiment, the RAM is configured to cache at least one further rule entry corresponding to at least one rule that does not belong to any of the selected rule patterns, for exact matching by the decision logic of the classification keys to the at least one further rule entry.

In some embodiments, the decision logic is configured, upon matching a classification key to a given rule in the TCAM, to cache a corresponding rule entry in the RAM under a rule pattern to which the given rule belongs. In a disclosed embodiment, the rules have respective priorities, and the decision logic is configured to cache the corresponding rule entry in the RAM under the rule pattern only after verifying that there is no other uncached rule with a higher priority than the given rule for which there are classification keys that match both the other uncached rule and the given rule.

In one embodiment, the apparatus includes a TCAM cache, which is configured to cache one or more of the rule entries in addition to the rule entries that are cached in the RAM, wherein the decision logic is configured to match the respective classification keys to the cached rule entries in both the RAM and the TCAM cache before attempting to match the respective classification keys to the rules in the TCAM.

In some embodiments, the one or more ports, the RAM, the decision logic and the TCAM interface are embodied in a first integrated circuit (IC) chip, while the TCAM is embodied in a second IC chip, connected to the first IC chip via the TCAM interface.

In a disclosed embodiment, the rules indicate corresponding actions to be applied to the data packets, and wherein the decision logic is configured, after matching the respective classification keys to the rule entries, to forward the data packets while applying the actions indicated by the matching rule entries.

There is also provided, in accordance with an embodiment of the invention, a method for communication, which includes storing in a ternary content-addressable memory (TCAM) a corpus of rules. Each rule includes a respective set of unmasked bits having corresponding bit values, and at least some of the rules including masked bits in addition to the unmasked bits. The rules are grouped into respective rule patterns, each rule pattern defining a different, respective sequence of masked and unmasked bits to which one or more of the rules conform. One or more of the rule patterns are selected for caching, and rule entries corresponding to rules belonging to the selected rule patterns are cached in a random access memory (RAM) in a network device. Upon receiving in the network device data packets from a network, the network device extracts respective classification keys from the data packets, each classification key including a string of bits extracted from selected fields in a given data packet. The network device classifies the data packets device by first matching the respective classification keys to the cached rule entries in the RAM and, when no match is found in the RAM, by matching the respective classification keys to the rules in the TCAM.

The present invention will be more fully understood from the following detailed description of the embodiments thereof, taken together with the drawings in which:

DETAILED DESCRIPTION OF EMBODIMENTS

Overview

Figure 1:
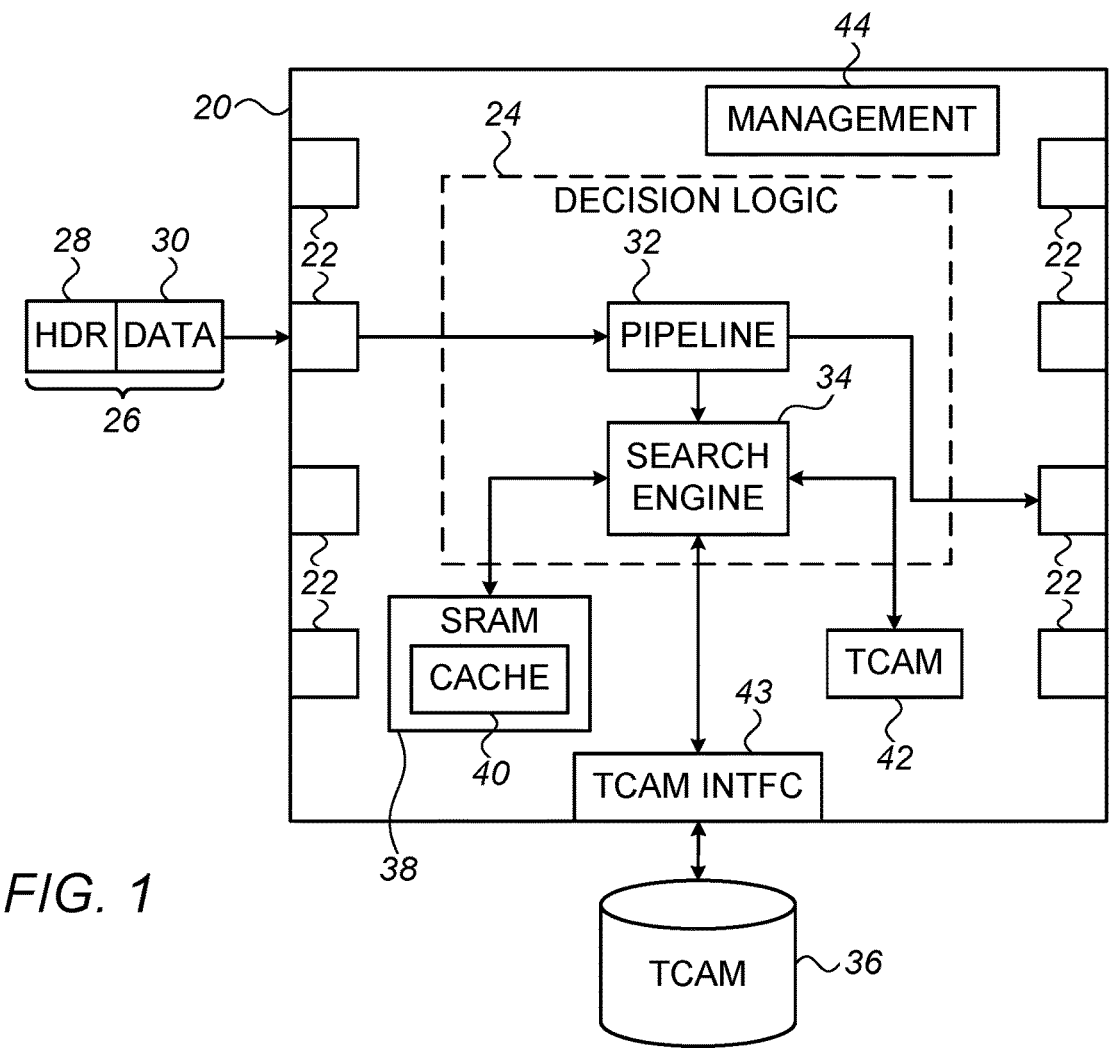
FIG. 1 is a block diagram that schematically illustrates a packet switch, in accordance with an embodiment of the invention.

Large-scale, high-speed packet networks, such as those deployed in modern data centers, require switching and forwarding elements to support large numbers of rules for packet classification and handling. New network management standards and practices, such as the OpenFlow protocol, are driving demand both to increase the number of rules implemented by network devices and to enable frequent modification of the rules by remote administration. TCAM is a convenient vehicle for storage and lookup of such rules.

As against these advantages, however, TCAMs are costly in terms of power consumption and chip area. When a large number of rules are to be stored and enforced by a network device, the TCAM array may be too large to incorporate in an integrated circuit (IC) chip, such as a packet switching chip, that handles actual packet transfers. In such cases, a TCAM chip is typically coupled externally to the packet transfer chip via an interface between the chips. In this configuration, however, the rate at which the network device is able to check the rules for application to incoming patents is limited by the bandwidth of the interface between the packet transfer chip and the TCAM chip, which is generally far lower than the bandwidth of on-chip memory access.

Embodiments of the present invention that are described herein address this problem by using RAM to cache a small portion of the rules on the packet transfer chip, while the large bulk of the rules remains in a separate TCAM. These embodiments take advantage of the observation that in most networks, packet traffic is not uniformly distributed; rather, a small number of flows (commonly referred to as "elephant flows") tend to take up most of the traffic bandwidth. Thus, the RAM cache need hold only a small number of frequently-used rule entries, and the TCAM is accessed only when there is a cache miss.

The disclosed embodiments enable exact matching of classification keys using hash tables stored in on-chip RAM. (Hash tables require only RAM, and not TCAM.) Since TCAM rules can include don't care ('x') bits, they cannot be directly used in the exact matching tables, because a hash function will not generally map all the rules that match the 'x' bits to the same position in the RAM table. Therefore, in the present embodiments, the rules are mapped to entries in a matching table in RAM using only the bits of the rules that are unmasked (having the value '1' or '0' in the rule, and not 'x'). This mapping makes use of "rule patterns," which define sequences of masked and unmasked bits to which one or more of the rules conform. In other words, denoting the unmasked bits as 'u' (which can be '0' or '1' but not 'x'), any given rule pattern is defined by the positions of the u bits. The rules belonging to a rule pattern can then be stored in the RAM and retrieved using exact matching on the 'u' bits.

In some embodiments of the present invention, more complex sorts of rule patterns can be used for matching. For example, the above-mentioned U.S. Patent Application Publication 2017/0052731 describes the use of Extended Rule Patterns (eRPs) as a means for reducing the number of accesses to the hash tables in the RAM. Such eRPs group multiple rule patterns together for a single exact-match access by using a subset of the unmasked 'u' bits for the hash. In other words, the respective set of unmasked bits in any rule pattern that is grouped into a given extended rule pattern is a superset of the unmasked bits in the extended rule pattern. (The terms "subset" and "superset" as used herein include improper subsets and supersets, i.e., a rule pattern may have the same set of 'u' bits as the extended rule pattern to which it belongs.) Although the specific examples described below relate, for the sake of simplicity, to simple rule patterns without this sort of extension, the principles of the present invention can similarly be applied, mutatis mutandis, using other sorts of rule patterns, such as eRPs. These alternative implementations are considered to be within the scope of the present invention.

The embodiments described hereinbelow relate to communication apparatus, such as a network device, having one or more ports, which receive data packets from a network. Decision logic in the network device classifies the packets. Such a network device may comprise a switch, for example, in which the decision logic forwards the data packets while applying actions in accordance with rules pertaining to the packet classification. For purposes of this classification, the device comprises a TCAM interface for connection to a TCAM, which stores a corpus of rules. As explained earlier, each such rule comprises a respective set of unmasked bits having corresponding bit values, and at least some of the rules comprise masked bits in addition to the unmasked bits. The rules may be sorted and labeled in advance according to the rule patterns to which they conform.

A RAM, typically (although not necessarily) on the same chip as the ports and decision logic, caches rule entries corresponding to rules belonging to one or more selected rule patterns. The rule entries can advantageously be cached in the RAM in multiple tables, each corresponding to one of the selected rule patterns. The RAM may also cache rule entries corresponding to rules that do not belong to any of the selected rule patterns, in a table for exact matching by the decision logic.

The decision logic extracts respective classification keys from the received data packets. Each key comprises a string of bits extracted from selected fields (typically header fields) in each data packet. To classify the data packets, the decision logic first attempts to match the classification keys to the cached rule entries in the RAM. To facilitate this search, for each cached rule pattern, the decision logic can mask the bits of the key with a mask corresponding to the masked bits in the rule pattern, and then compares only the unmasked bits of the classification keys to the cached rule entries in the table belonging to this rule pattern. This comparison can be carried out advantageously and rapidly by computing a hash over the unmasked bits and using the hash to access the table entries.

Only when no match is found in the RAM does the decision logic proceed to match the classification keys to the rules in the TCAM. Upon matching a classification key to a rule in the TCAM, the decision logic may then cache a corresponding rule entry in the RAM, either under a rule pattern to which the rule belongs or in the exact match table, while possibly ejecting another rule entry that was accessed less recently.

The classification keys can advantageously be selected so as to correspond to packet flows, for example using the 5-tuple fields in the packet header. In this case, rule entries pertaining to elephant flows will tend to be saved in the cache. The organization of the cache in terms of rule patterns facilitates efficient use of and access to the cache by the decision logic. Because the remaining rules in the TCAM will be less frequently accessed, the limited bandwidth of the TCAM interface will not generally be a bottleneck in packet handling by the network device.

Although the embodiments described herein relate, for the sake of clarity and concreteness, to a specific sort of packet processing application and device architecture, the principles of the present invention may alternatively be implemented in other environments in which there is a need for caching of TCAM-style rules. These alternative applications are also considered to be within the scope of the present invention.

System Description

FIG. 1 is a block diagram that schematically illustrates a packet switch 20, which operates as communication and classification apparatus in accordance with an embodiment of the invention. Switch 20 may be configured, for example, as a network bridge or router, with multiple ports 22 connected to a packet communication network. Alternatively, the elements and operating principles of switch 20 may be incorporated in other sorts of network devices that are required to perform packet classification, such as advanced network interface controllers (NICs). The elements that are contained within the block of switch 20 in FIG. 1 can advantageously (although not necessarily) be implemented in a single IC chip. Alternatively, multi-chip implementations are also within the scope of the present invention.

Decision logic 24 within switch 20 applies classification rules in forwarding data packets 26 between ports 22, as well as performing other actions, such as encapsulation and de-capsulation, security filtering, and/or quality-of-service functions. The circuitry needed for carrying out such forwarding and other functions will be apparent to those skilled in the art and is omitted from the figures for the sake of simplicity, in order to concentrate on the actual classification functions of decision logic 24.

In the pictured embodiment, decision logic 24 receives packet 26 containing a header 28 and payload data 30. A processing pipeline 32 in decision logic 24 extracts a classification key from each packet 26, typically (although not necessarily) including the contents of certain fields of header 28. For example, the key may comprise the source and destination addresses and ports and a protocol identifier, known as the "5-tuple." Pipeline 32 passes the key to a search engine 34, which attempts to match the key against rule entries in a cache 40, which is stored in a static RAM (SRAM) 32 in switch 20, as described in detail hereinbelow. SRAM 32 also contains a list of actions (not shown) to be performed when a key is found to match one of the rule entries. For this purpose, each rule entry typically contains a pointer to the particular action that decision logic 24 is to apply to packet 26 in case of a match. Optionally, some rule entries are held in an on-chip TCAM cache 42, as explained further hereinbelow.

The rule entries in cache 40 are a subset of a corpus of rules that is stored in a TCAM 36, typically (although not necessarily) in a separate chip. Each rule comprises a respective set of unmasked bits having corresponding bit values, while at least some of the rules comprise masked bits in addition to the unmasked bits. When search engine 34 does not find a match to a given classification key in cache 40 (or in TCAM cache 42, if present), it queries TCAM 36 via a TCAM interface 43. TCAM 36 returns an index or indexes of rules that match the key, and these results are applied by decision logic 24 in looking up the corresponding action and then processing and forwarding data packet 26 accordingly.

Decision logic 24 typically comprises dedicated or programmable hardware logic, which is configured to carry out the functions described herein. For example, switch 20, including decision logic 24, may comprise a suitable application-specific integrated circuit (ASIC). Alternatively or additionally, at least some of the functions of decision logic 24 may be implemented in an embedded microprocessor.

In addition, switch 20 comprises a management processor 44, typically comprising a standalone or embedded microprocessor. Management processor 44 receives and stores classification rules in TCAM 36 and updates the rules as required. Management processor 44 may also be responsible for compiling the classification rules into rule patterns (possibly including extended rule patterns, as defined above) and deciding which rules and/or rule patterns are eligible for storage in cache 40. Alternatively, the rule pattern information may be compiled by a server (not shown) and downloaded, along with the rules themselves, from the server to chip 20. In either case, processor 44 performs its functions under the control of software or firmware instructions, which are typically stored in tangible, non-transitory computer-readable storage media, such as electronic, optical, or magnetic memory media.

Figure 2:
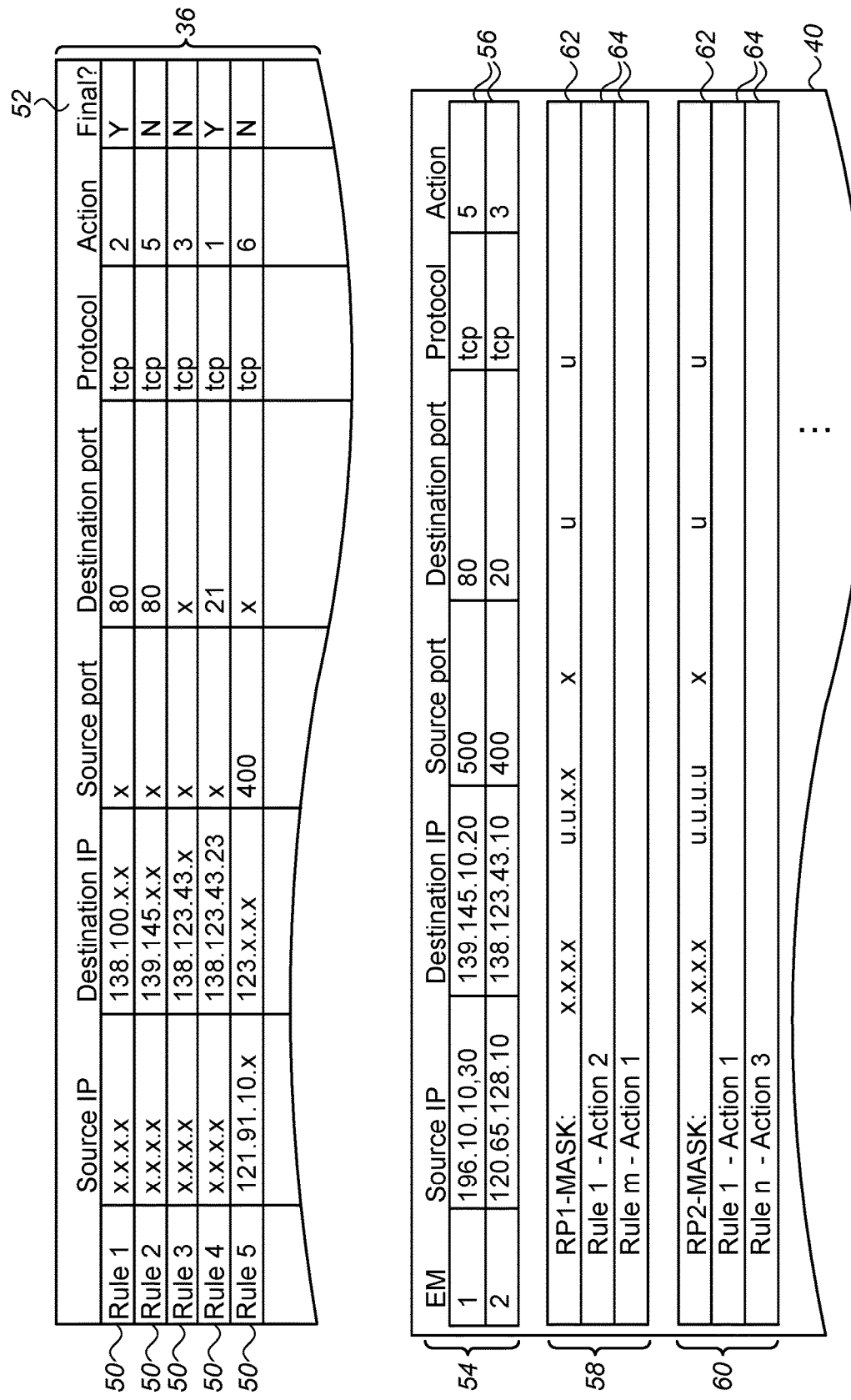
FIG. 2 is a block diagram that schematically illustrates data structures used in rule-based classification, in accordance with an embodiment of the invention.

FIG. 2 is a block diagram that schematically illustrates data structures used by decision logic 24 in rule-based packet classification, in accordance with an embodiment of the invention. Rules 50 are stored in TCAM 36. Each rule comprises a key based on the above-mentioned 5-tuple fields, with masked bits marked 'x', and an index indicating the action to be taken in case of a match. When the 5-tuple of a given packet 26 matches more than one rule 50, TCAM 36 will typically return the action having the highest priority (as indicated, for example, by a priority field in the list of actions stored in SRAM 38). Thus, for instance, a packet whose 5-tuple matches Rule 4 that is listed in TCAM 36 will also match Rule 3. When search engine 34 attempts to look up the corresponding rule entries in cache 40, it will select the matching rule entry that has the highest priority.

Each rule 50 in TCAM 36 also includes a flag 52 indicating whether the rule is a "final match," meaning that there is no other uncached rule that can potentially match a classification key and has an action with a higher priority than the given rule. Only rules that are flagged as satisfying the final match criterion can be entered in cache 40 under corresponding rule patterns. Thus in the example shown in FIG. 2, Rule 4 is eligible for rule pattern caching. Rule 3, which has a lower priority, in not cacheable, because such caching would result in incorrect classification of packets satisfying Rule 4.

This limitation may be undesirable if the rule pattern of Rule 3 applies to high-bandwidth packet flows, since it will require search engine 34 to access TCAM 36 more frequently. This problem can be mitigated by storing the higher-priority rule (Rule 4 in the present example) in TCAM cache 42. Search engine 34 attempts to match the packet classification keys to the cached rule entries in TCAM cache 42 and then in SRAM 38 before searching for a match in TCAM 36. Thus, once Rule 4 is stored in TCAM cache 42, flag 52 of Rule 3 can be changed to 'Y', indicating that this rule is now eligible for rule pattern caching in cache 40. Even if Rule 3 is now cached, search engine 34 will find a match to Rule 4 in TCAM cache 42 when appropriate, and the correct action will be invoked in all cases.

Cache 40 in SRAM 38 includes an exact match (EM) table 54 and rule pattern tables 58, 60, . . . . Each exact match entry 56 in table 54 is created by search engine 34 after processing a packet whose specific classification key matched a rule 50 (in TCAM 36) that is not eligible for caching in cache 40 under the corresponding rule pattern. If the packet belongs to a high-bandwidth flow, it is desirable in this case that a corresponding exact match entry 56 be held in table 54 in order to avoid repeat accesses to TCAM 36. Thus, for example, the second entry in table 54 corresponds to a packet that matched Rule 3 in TCAM 36. Because flag 52 for Rule 3 is set to 'N', search engine 34 creates exact match entry 56 for the classification key of this packet.

Cache 40 also contains respective rule pattern (RP) tables 58, 60, . . . , for the rule patterns that are chosen for caching. (Although tables 58 and 60 in FIG. 2 refer, for the sake of simplicity, to simple rule patterns, the rule pattern tables may additionally or alternatively refer to extended rule patterns, as defined above.) Each cached rule pattern has a respective mask 62, indicating which bits of the 5-tuple fields are masked ('x') and which are unmasked ('u') in the rule pattern. Thus, for example, mask 62 for the first rule pattern (RP1) indicates that the source IP address, the two least-significant bytes of the destination IP address, and the source port in the 5-tuple classification key are masked, while the remaining bytes are unmasked. This pattern applies, in the present example, to Rules 1 and 2 in TCAM 36. In a similar fashion, mask 62 for RP2 applies to Rule 4.

Each RP table 58, 60, . . . , contains respective rule entries 64 corresponding to rules 50 that were found to match the rule pattern of the table and indicating the action to be taken when a classification key matches a given entry. To match a classification key against entries in any given RP table 58, 60, . . . , search engine 34 compares only the bits of the classification keys that are unmasked by the respective mask 62 to the entries 64 in the RP table. Typically, search engine 34 computes a hash over the bits of the classification key that are unmasked by the respective mask 62 for each rule pattern, and accesses the cached rule entries 64 belonging to the rule pattern using the hash.

Thus, after first checking TCAM cache 42 (assuming such a cache is used), search engine 34 computes a different, respective hash over the classification key at hand in order to search each of tables 54, 58, 60, . . . . (For exact match table 54, the hash is computed over all of the bits of the classification key.) Once a match has been found to an entry 56 or 64 in one of the tables, no further searching is required, and search engine 34 can return the action indicated by the entry and continue to the next packet. The search engine can search the tables in any desired order. For example, to reduce search time, the order of tables to search may be set so that the table that has given the most frequent matches is searched first. The search order can be changed dynamically, if desired, in order to adjust for changing match frequencies in the different tables.

Methods of Classification and Caching

Figure 3:
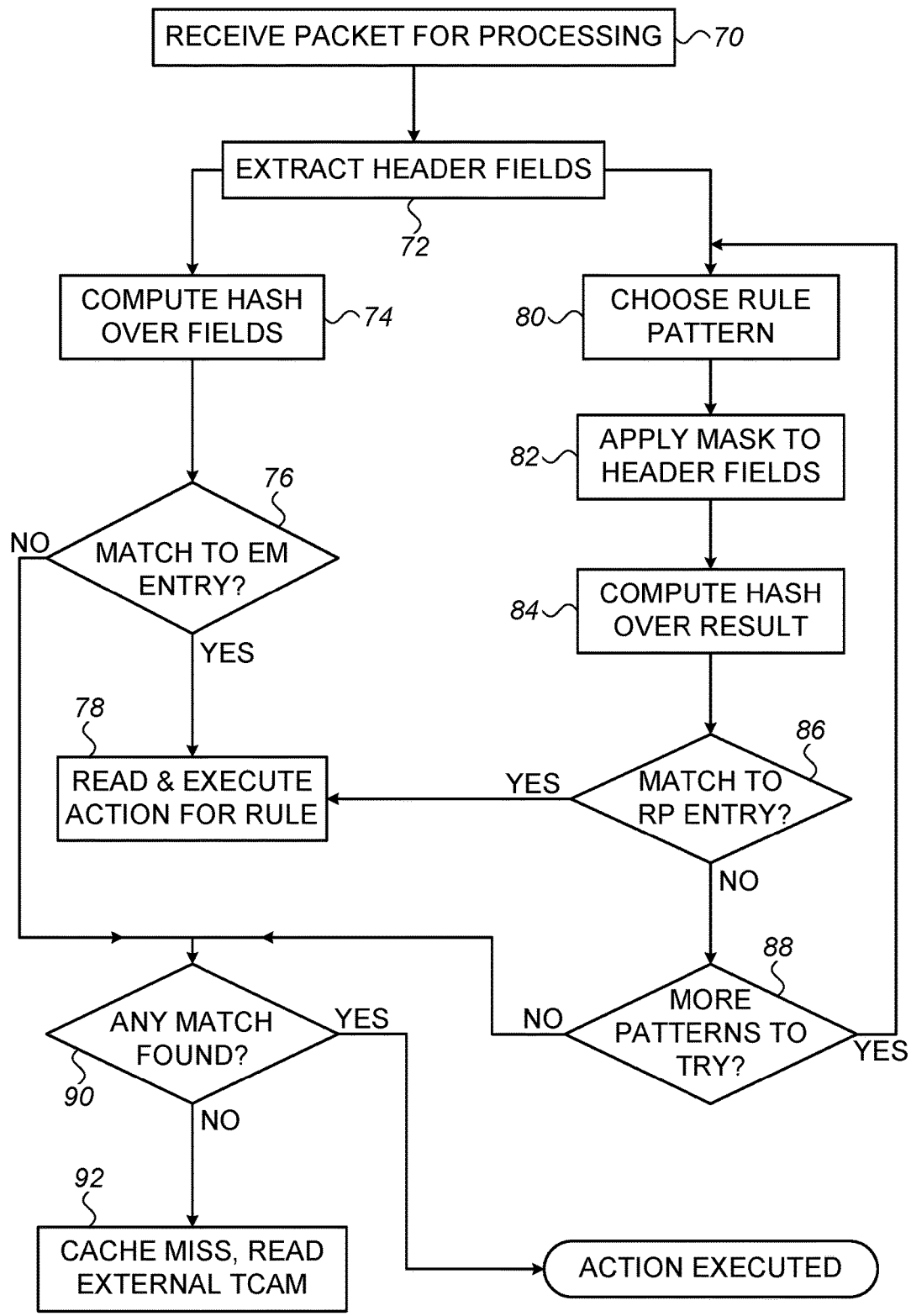
FIG. 3 is a flow chart that schematically illustrates a method for packet classification, in accordance with an embodiment of the invention.

FIG. 3 is a flow chart that schematically illustrates a method for packet classification, in accordance with an embodiment of the invention. For the sake of clarity, this method is described with reference to the apparatus of FIG. 1 and the data structures that are shown in FIG. 2. Variations on this method using other apparatus and alternative data structures built around rule patterns (or specifically, extended rule patterns) will be apparent to those skilled in the art after reading the present description and are also within the scope of the present invention. Furthermore, although this and other embodiments described herein relate specifically to forwarding of data packets in switch 20, the principles of these embodiments may similarly be applied in other sorts of packet classification and processing operations.

The method of FIG. 3 is initiated when decision logic 24 receives packet 26 for processing, at a packet input step 70. Pipeline 32 extracts the fields from packet header 28 that are to serve as the classification key for the packet, for example the 5-tuple field values, at a key extraction step 72. Search engine 34 will attempt to match this key to an entry in either EM table 54 or one of RP tables 58, 60, . . . . As noted earlier, the search engine may address these tables in any desired order, and the exact match and RP matching branches are therefore shown as parallel paths in FIG. 3. As an initial step, when TCAM cache 42 is present, search engine 34 checks the classification key against the rules in the TCAM cache; but this branch is omitted from FIG. 3 for the sake of simplicity.

To search EM table 54, search engine 34 computes a hash over all of the bits in the classification key, in an EM hashing step 74. The search engine then reads entry 56 in EM table 54 that corresponds to the hash result and evaluates whether this entry matches the classification key, at an EM matching step 76. If a match is found, search engine 34 reads the corresponding action and passes the action instructions to pipeline 32 for execution, at an action execution step 78. At this point, the search ends, and search engine 34 can go on to process the next packet.

To search RP tables 58, 60, ..., search engine 34 chooses one of the rule patterns in cache 40, at a pattern selection step 80. The search engine reads and applies the corresponding mask 62 to the header fields in the classification key, at a masking step 82. The search engine then computes a hash over the unmasked bits of the classification key, at an RP hashing step 84. Using the hash result, the search engine reads the corresponding entry 64 in the RP table and evaluates whether this entry matches the classification key, at an RP matching step 86. If a match is found, search engine 34 reads the corresponding action and passes on the action for execution at step 78. In this case, again, the search ends.

Otherwise, if no match is found for a given rule pattern at step 86, search engine 34 checks whether there are any remaining rule patterns against which the current classification key has not yet been matched, at a pattern checking step 88. If so, the search engine returns to step 80 and chooses the next pattern.

In the event of a negative result at either of steps 76 and 88, search engine 34 checks whether all the tables have been searched without any match having been found, at a table checking step 90. If no more tables remain to be checked, search engine 34 refers the classification key to TCAM 36, at a cache miss step 92. The applicable action (or actions) are then read from TCAM 36, and the action with highest priority is applied to the packet. The rule 50 in TCAM 36 from which the action was derived is now a candidate for caching in SRAM 38, as detailed further hereinbelow.

Figure 4:
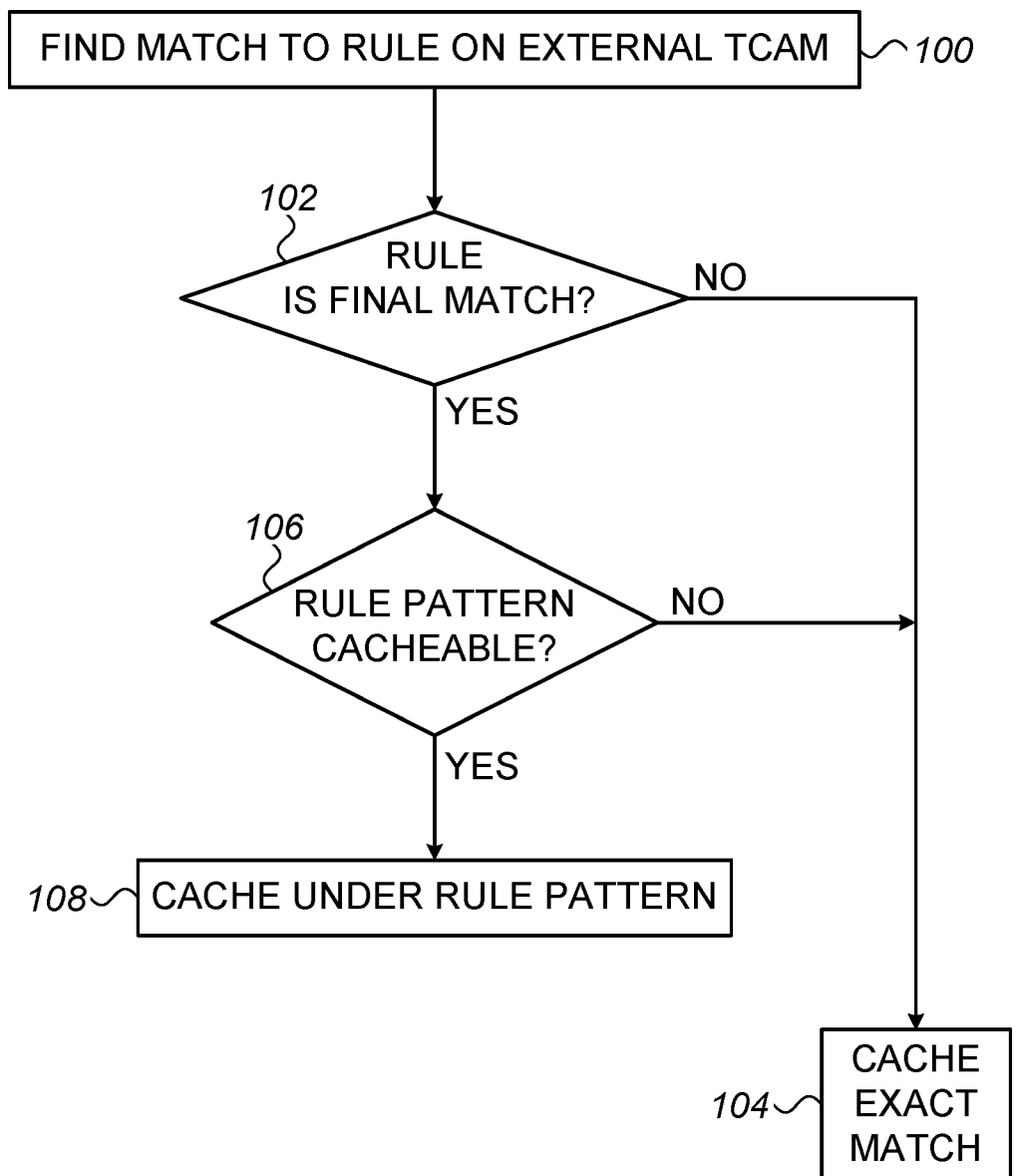
FIG. 4 is a flow chart that schematically illustrates a method for adding a new rule entry to a cache, in accordance with an embodiment of the invention.

FIG. 4 is a flow chart that schematically illustrates a method for adding a new rule entry to cache 40, in accordance with an embodiment of the invention. Search engine 34 applies this method upon matching a classification key to a given rule 50 in TCAM 36 following a cache miss at step 92. Search engine 34 attempts to cache a corresponding rule entry 64 in one of tables 58, 60, ..., under a rule pattern to which the given rule belongs. For this purpose, search engine 34 may also add new rule patterns and corresponding RP tables 58, 60, ..., to cache 40 when appropriate.

The method of FIG. 4 is initiated, as noted above, when search engine 34 matches a classification key to a rule in TCAM 36 (following a cache miss), at a TCAM matching step 100. Search engine 34 will cache a rule entry in SRAM 38 under a corresponding rule pattern only after verifying that there is no other uncached rule with a higher priority than the given rule for which there are classification keys that match both the other uncached rule and the given rule. For this purpose, search engine 34 checks final match flag 52 of the corresponding rule 50, at a final matching step 102. If the flag is set to 'N', as explained above, the rule is not a candidate for pattern-based caching. Instead, search engine 34 may add an exact match entry 56 to EM table 54, containing the entire key of the current packet and a pointer to the corresponding action, at an EM caching step 104.

If match flag 52 is set to 'Y', search engine 34 checks whether a rule pattern corresponding to rule 50 already exists in cache 40 or can be added to cache 40 as a new RP table, at a pattern cacheability checking step 106. (For example, the respective frequencies of rule patterns over the corpus of rules in TCAM 36 may be computed in advance, and rule patterns that occur with low frequency may be labeled as non-cacheable.) Again, if the rule pattern is not cacheable, search engine may add an exact match entry to EM table 54 at step 104, as explained above.

If the rule matched at step 100 is found to be "final" and to belong to a cacheable pattern, at steps 102 and 106, search engine 34 adds a corresponding rule entry 64 in the appropriate RP table 58, 60, ..., at a pattern caching step 108. As noted above, a new RP table may be created in cache 40 for this purpose if needed. To create the rule entry in the appropriate RP table, search engine 34 applies the corresponding mask 62 to the current classification key, and then computes a hash over the unmasked bits in order to determine the position in the RP table in which the rule entry should be placed. If the position is occupied, search engine 34 can eject an existing entry from the table. Any suitable cache eviction policy that is known in the art can be used for this purpose, such as eviction of the entry that was least recently accessed.

To enhance the efficiency of cache lookup and replacement, the methods described above can be used in conjunction with other sorts of cache access and matching schemes, such as the techniques described in U.S. patent application Ser. No. 15/257,957, filed Sep. 7, 2016, whose disclosure is incorporated herein by reference.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A communication apparatus, comprising:
   one or more ports, configured to receive data packets from a network;
   a TCAM interface, configured for connection to a ternary content-addressable memory (TCAM), which stores a corpus of rules, each rule comprising a respective set of unmasked bits having corresponding bit values and a corresponding action to be applied to the data packets that match the bit values, and at least some of the rules comprising masked bits in addition to the unmasked bits,
   wherein the rules conform to respective rule patterns, each rule pattern defining a different, respective sequence of masked and unmasked bits to which one or more of the rules conform;
   a random access memory (RAM), which is configured to cache rule entries, comprising respective matching values and corresponding actions, which correspond to rules belonging to one or more of the rule patterns that have been selected for caching; and
   decision logic which is configured to extract respective classification keys from the data packets, each classification key comprising a string of bits extracted from selected fields in a given data packet, and to classify the data packets by first matching the respective classification keys to the matching values of the cached rule entries in the RAM and, when no match is found in the RAM, by matching the respective classification keys to the rules in the TCAM.

2. The apparatus according to claim 1, wherein the decision logic is configured to match the respective classification keys to the cached rule entries by applying to the classification keys, for each rule pattern among the selected rule patterns, a respective mask corresponding to the masked bits in the rule pattern, and to compare only the bits of the classification keys that are unmasked by the respective mask to the cached rule entries belonging to the rule pattern.

3. The apparatus according to claim 2, wherein the decision logic is configured to compute a hash over the bits of the classification key that are unmasked by the respective mask for each rule pattern among the selected rule patterns, and to access the cached rule entries belonging to the rule pattern in the RAM using the hash.

4. The apparatus according to claim 2, wherein a plurality of the rule patterns, having different, respective masks, are selected for caching, and the rule entries belonging to the selected rule patterns are stored in a plurality of respective tables in the RAM, and wherein the decision logic is configured to search each of the tables using the respective mask of the rule pattern.

5. The apparatus according to claim 2, wherein the selected rule patterns comprise an extended rule pattern, wherein the rule patterns are grouped into extended rule patterns such that the respective set of unmasked bits in any rule pattern that is grouped into the extended rule pattern is a superset of the unmasked bits in the extended rule pattern, and wherein the decision logic is configured to apply the respective mask corresponding to the masked bits in the extended rule pattern in order to search the cached rule entries belonging to the extended rule pattern in the RAM.

6. The apparatus according to claim 1, wherein the RAM is configured to cache at least one further rule entry corresponding to at least one rule that does not belong to any of the selected rule patterns, for exact matching by the decision logic of the classification keys to the at least one further rule entry.

7. The apparatus according to claim 1, wherein the decision logic is configured, upon matching a classification key to a given rule in the TCAM, to cache a corresponding rule entry in the RAM under a rule pattern to which the given rule belongs.

8. The apparatus according to claim 7, wherein the rules have respective priorities, and wherein the decision logic is configured to cache the corresponding rule entry in the RAM under the rule pattern only after verifying that there is no other uncached rule with a higher priority than the given rule for which there are classification keys that match both the other uncached rule and the given rule.

9. The apparatus according to claim 1, and comprising a TCAM cache, which is configured to cache one or more of the rule entries in addition to the rule entries that are cached in the RAM, wherein the decision logic is configured to match the respective classification keys to the cached rule entries in both the RAM and the TCAM cache before attempting to match the respective classification keys to the rules in the TCAM.

10. The apparatus according to claim 1, wherein the one or more ports, the RAM, the decision logic and the TCAM interface are embodied in a first integrated circuit (IC) chip, while the TCAM is embodied in a second IC chip, connected to the first IC chip via the TCAM interface.

11. The apparatus according to claim 1, wherein the decision logic is configured, after matching the respective classification keys to the rule entries, to forward the data packets while applying the actions indicated by the matching rule entries.

12. A method for communication, comprising:

storing in a ternary content-addressable memory (TCAM) a corpus of rules, each rule comprising a respective set of unmasked bits having corresponding bit values and a corresponding action to be applied to the data packets that match the bit values, and at least some of the rules comprising masked bits in addition to the unmasked bits;

grouping the rules into respective rule patterns, each rule pattern defining a different, respective sequence of masked and unmasked bits to which one or more of the rules conform;

selecting one or more of the rule patterns for caching;

caching rule entries, comprising respective matching values and corresponding actions, which correspond to rules belonging to the selected rule patterns in a random access memory (RAM) in a network device;

receiving in the network device data packets from a network;

extracting in the network device respective classification keys from the data packets, each classification key comprising a string of bits extracted from selected fields in a given data packet; and classifying the data packets in the network device by first matching the respective classification keys to the matching values of the cached rule entries in the RAM and, when no match is found in the RAM, by matching the respective classification keys to the rules in the TCAM.

13. The method according to claim 12, wherein matching the respective classification keys to the cached rule entries comprises applying to the classification keys, for each rule pattern among the selected rule patterns, a respective mask corresponding to the masked bits in the rule pattern, and comparing only the bits of the classification keys that are unmasked by the respective mask to the cached rule entries belonging to the rule pattern.

14. The method according to claim 13, wherein comparing only the bits of the classification keys that are unmasked comprises computing a hash over the bits of the classification key that are unmasked by the respective mask for each rule pattern among the selected rule patterns, and accessing the cached rule entries belonging to the rule pattern in the RAM using the hash.

15. The method according to claim 13, wherein a plurality of the rule patterns, having different, respective masks, are selected for caching, and caching the rule entries comprises storing the rule entries belonging to the selected rule patterns in a plurality of respective tables in the RAM, and wherein applying the respective mask comprises searching each of the tables using the respective mask of the rule pattern.

16. The method according to claim 13, wherein the selected rule patterns comprise an extended rule pattern, wherein the rule patterns are grouped into extended rule patterns such that the respective set of unmasked bits in any rule pattern that is grouped into the extended rule pattern is a superset of the unmasked bits in the extended rule pattern, and wherein applying the respective mask comprises applying the mask corresponding to the masked bits in the extended rule pattern in order to search the cached rule entries belonging to the extended rule pattern in the RAM.

17. The method according to claim 12, and comprising caching in the RAM at least one further rule entry corresponding to at least one rule that does not belong to any of the selected rule patterns, wherein classifying the data packets comprises searching for an exact match of the classification keys to the at least one further rule entry.

18. The method according to claim 12, and comprising, upon matching a classification key to a given rule in the TCAM, caching a corresponding rule entry in the RAM under a rule pattern to which the given rule belongs.

19. The method according to claim 18, wherein the rules have respective priorities, and wherein caching the corresponding rule entry comprises caching the corresponding rule entry in the RAM under the rule pattern only after verifying that there is no other uncached rule with a higher priority than the given rule for which there are classification keys that match both the other uncached rule and the given rule.

20. The method according to claim 12, and comprising caching one or more of the rule entries in a TCAM cache in addition to the rule entries that are cached in the RAM, wherein classifying the data packets comprises matching the respective classification keys to the cached rule entries in both the RAM and the TCAM cache before attempting to match the respective classification keys to the rules in the TCAM.

21. The method according to claim 12, wherein the network device is embodied in a first integrated circuit (IC) chip, while the TCAM is embodied in a second IC chip, connected to the first IC chip via a TCAM interface.

22. The method according to claim 12, wherein the method includes, after matching the respective classification keys to the rule entries, forwarding the data packets while applying the actions indicated by the matching rule entries.

* * * * *